(12) United States Patent
Kim

(10) Patent No.: US 11,021,104 B2
(45) Date of Patent: Jun. 1, 2021

(54) AROUND VIEW MONITORING SYSTEM AND OPERATING METHOD THEREOF

(71) Applicant: HYUNDAI AUTRON CO., LTD., Seoul (KR)

(72) Inventor: Kee Beom Kim, Seoul (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 0 days.

(21) Appl. No.: 16/431,494

(22) Filed: Jun. 4, 2019

(65) Prior Publication Data

US 2019/0375330 A1 Dec. 12, 2019

(30) Foreign Application Priority Data

Jun. 7, 2018 (KR) .................. 10-2018-0065286

(51) Int. Cl.
  *B60R 1/06* (2006.01)
  *B60R 1/00* (2006.01)
  *G06T 5/50* (2006.01)

(52) U.S. Cl.
  CPC .............. *B60R 1/00* (2013.01); *G06T 5/50* (2013.01); *B60R 2300/105* (2013.01); *B60R 2300/303* (2013.01); *B60R 2300/50* (2013.01); *B60R 2300/802* (2013.01); *G06T 2207/30248* (2013.01)

(58) Field of Classification Search
  None
  See application file for complete search history.

(56) References Cited

U.S. PATENT DOCUMENTS

| 2010/0220190 | A1* | 9/2010 | Hiroshi | ..................... B60R 1/00 |
| | | | | 348/148 |
| 2015/0254825 | A1* | 9/2015 | Zhang | ...................... B60R 1/00 |
| | | | | 382/284 |

FOREIGN PATENT DOCUMENTS

| KR | 10-2012-0130798 A | 12/2012 |
| KR | 10-1714213 B1 | 3/2017 |
| KR | 10-1764106 B1 | 8/2017 |
| KR | 10-1795271 B1 | 11/2017 |
| KR | 10-1807090 B1 | 12/2017 |

* cited by examiner

*Primary Examiner* — Christopher G Findley
(74) *Attorney, Agent, or Firm* — Morgan, Lewis & Bockius LLP

(57) ABSTRACT

A method of operating an Around View Monitoring (AVM) system according to the present invention includes: obtaining image data from image sensors disposed at different locations of a vehicle; performing image processing on the image data for improving an image; performing lens distortion correction on the processed image data; detecting an overlapping region from the corrected image data; selecting an image display method so as to prevent the detected overlapping region from overlapping when the image is synthesized, and synthesizing the image data according to the selected image display method; and outputting the synthesized image data.

16 Claims, 13 Drawing Sheets

EXAMPLE 1

EXAMPLE 2

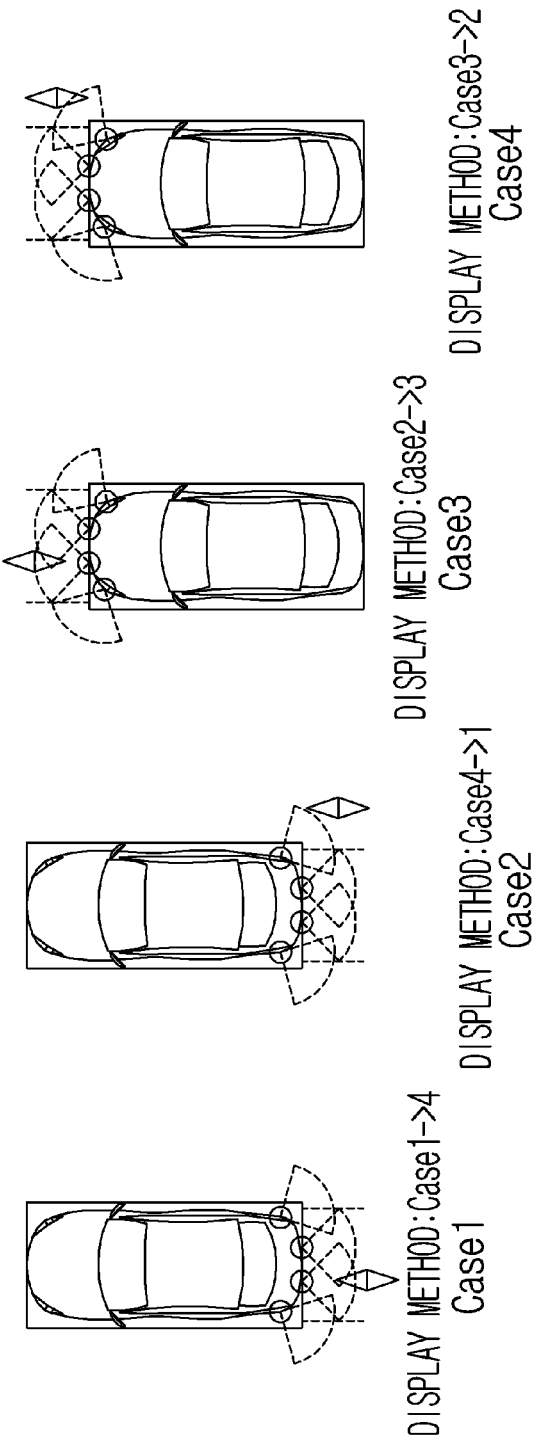

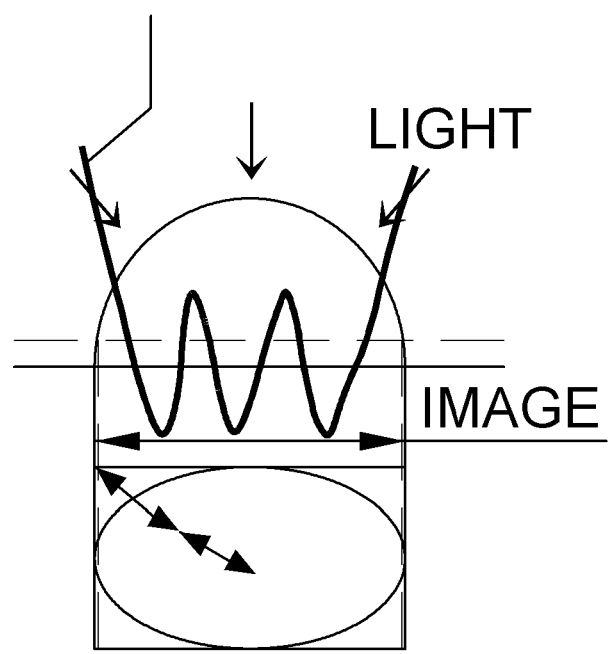

- (a),(b): SHIFT AND CONVERT PIXEL BY VARIABLE RATIO
- (c),(d): INTERPOLATION SPACE BY VARIABLE RATIO CONVERSION
- [6/40] : 6(PIXEL LOCATION), 40(PIXEL VALUE)

AROUND VIEW MONITORING SYSTEM AND OPERATING METHOD THEREOF

CROSS-REFERENCE TO RELATED APPLICATIONS

This application claims priority to and the benefit of Korean Patent Application No. 10-2018-0065286 filed in the Korean Intellectual Property Office on Jun. 7, 2018, the entire contents of which are incorporated herein by reference.

TECHNICAL FIELD

The present invention relates to an around view monitoring system and an operating method thereof.

BACKGROUND ART

As a technology for electronic components and image processing technology for a vehicle have been developed, research on an Advanced Driver Assistance System (ADAS) has been actively carried out recently. Recently, an Around View Monitoring (AVM) system, in which a plurality of cameras is installed around a vehicle to display 360° omnidirectional images of the surroundings of the vehicle, is also applicable to a vehicle. The AVM system combines images of the surroundings of the vehicle photographed through the plurality of cameras photographing the surroundings of the vehicle and provides a top view image as if which a driver looks at the vehicle in the sky, thereby enabling the driver to check an obstacle around the vehicle on a display.

SUMMARY OF THE INVENTION

The present invention has been made in an effort to provide an around view monitoring system which improves a blind spot, and an operating method thereof.

An exemplary embodiment of the present invention provides a method of operating an Around View Monitoring (AVM) system including: obtaining image data from image sensors disposed at different locations of a vehicle; performing image processing on the image data for improving an image; performing lens distortion correction on the processed image data; detecting an overlapping region from the corrected image data; selecting an image display method so as to prevent the detected overlapping region from overlapping when the image is synthesized, and synthesizing the image data according to the selected image display method; and outputting the synthesized image data.

The different locations of the vehicle may include a front side, a rear side, a left side, and a right side.

The performing of the lens distortion correction may include: setting an image center for the image data; setting a coefficient of a lens distortion correction rate function; performing horizontal image interpolation on the image data according to a variable ratio corresponding to the set coefficient; and performing vertical image interpolation on the image data.

According to the selection of the image display method, at a viewing angle of a single camera, a left region may be larger than a right region, a right region may be larger than a left region, or a right region may be the same as a left region.

The synthesizing of the image data may include synthesizing the image data by adjusting a lens distortion correction rate for a boundary portion between the image data.

The image display method may be selected based on steering information or object direction information.

When the steering information indicates that a steering angle is a predetermined steering angle or more, the image display method may be selected so as to enlarge a lateral outer peripheral display region.

When the object direction information indicates that a nearest object location is in a center direction within a detected region, the image display method may be selected for displaying a center region-centered image.

When the object direction information indicates that a nearest object location is in an outer peripheral direction within a detected region, the image display method may be selected for displaying an outer peripheral-centered image.

Another exemplary embodiment of the present invention provides an Around View Monitoring (AVM) system including: a plurality of cameras disposed in a vehicle and obtaining image data from a surrounding environment of the vehicle; an image signal processing device, which receives image data from the plurality of cameras, performs image processing on the received image data for improving an image; performs lens distortion correction on the processed image data, detects an overlapping region from the corrected image data, selects an image display method which does not overlap the overlapping region when the image is synthesized, and synthesizes the image data according to the selected image display method; and a display device, which displays the image data synthesized from the image signal processing device.

The image signal processing device may adjust a lens distortion correction rate of a synthesized boundary surface when the image data is synthesized.

The image signal processing device may select the image display method based on steering information or object direction information.

According to the selection of the image display method by the image signal processing device, at a viewing angle of a single camera, a left region may be larger than a right region, a right region may be larger than a left region, or a right region may be the same as a left region.

When the steering information indicates that a steering angle is a predetermined steering angle or more, the image signal processing device may select the image display method so as to enlarge a lateral outer peripheral display region.

When the object direction information indicates that a nearest object location is in a center direction within a detected region, the image signal processing device may select the image display method for displaying a center region-centered image.

When the object direction information indicates that a nearest object location is in an outer peripheral direction within a detected region, the image signal processing device may select the image display method for displaying an outer peripheral-centered image.

The AVM system according to the exemplary embodiment of the present invention and the operating method thereof synthesize an image based on a single viewing angle, thereby fundamentally preventing a phenomenon in which an object in a blind spot disappears.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings below are for helping to understand the present exemplary embodiment, and exemplary embodiments are provided together with the detailed description. However, a technical characteristic of the present exemplary embodiment is not limited to a specific drawing, and the characteristics disclosed in the drawings may be combined with each other to be configured as a new embodiment.

FIG. 4C is a diagram for describing a synthesized image display method according to information about a nearest object direction.

FIG. 5A, FIG. 5B, and FIG. 5C are diagrams illustrating an example of a method of adjusting the degree of distortion correction of an overlapping connection portion in the AVM system 10 according to the exemplary embodiment of the present invention, and FIG. 5A illustrates an image before the correction, FIG. 5B illustrates an image after the correction, and FIG. 5C illustrates an image obtained by applying a distortion correction rate to the image before the correction.

FIG. 6A illustrates first operation of a variable rate distortion correction method, FIG. 6B illustrates second operation of a variable rate distortion correction method, FIG. 6C illustrates third operation of a variable rate distortion correction method, and FIG. 6D illustrates fourth operation of a variable rate distortion correction method.

Figure 1:
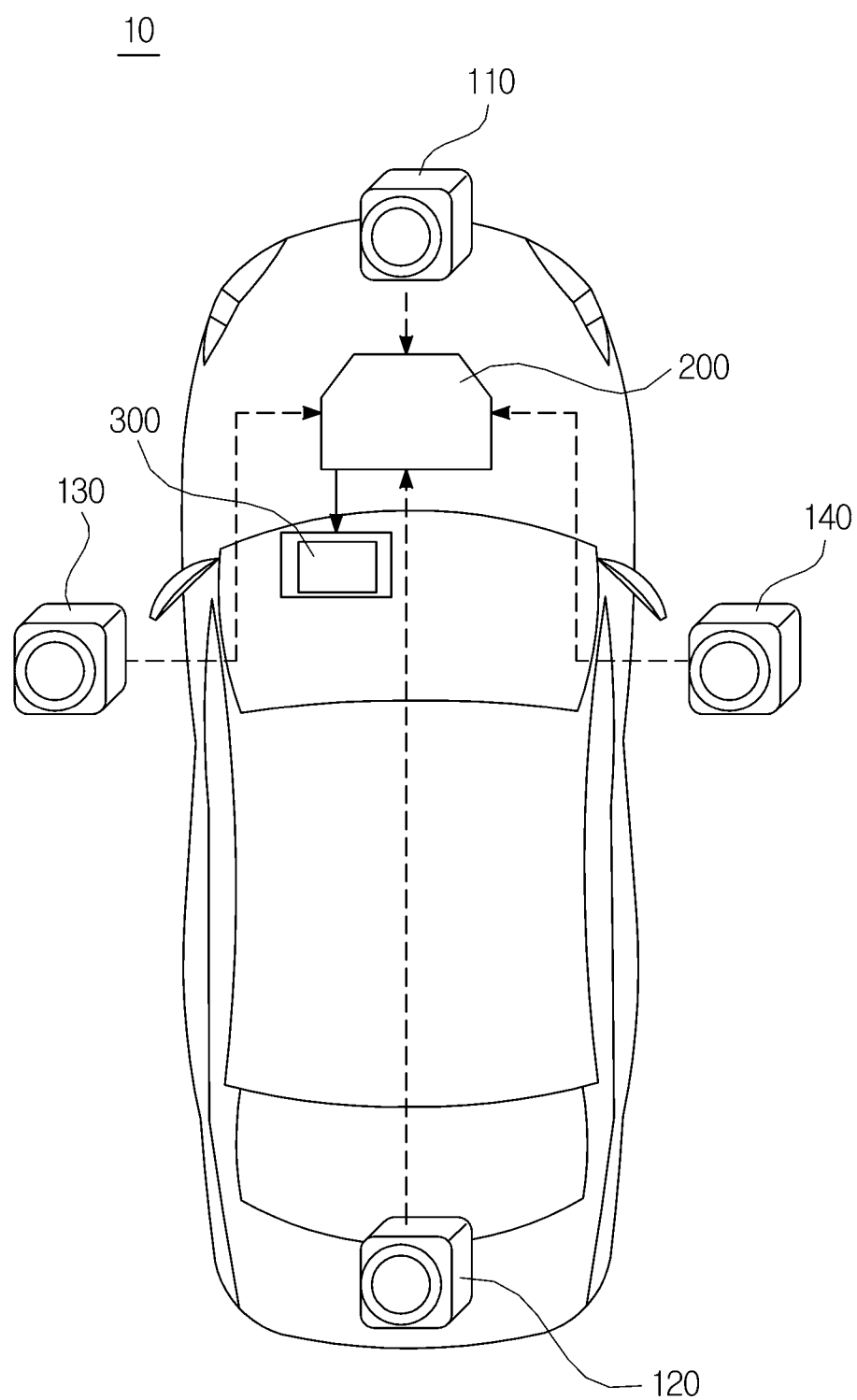
FIG. 1 is a diagram illustrating an example of an Around View Monitoring (AVM) system 10 according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In the following, the contents of the present invention will be described clearly and in detail by using the drawings so that those skilled in the art can easily carry out the present invention.

The present invention may be variously changed and have various forms, so that specific exemplary embodiments will be exemplified in the drawings and described in detail in the description below. However, this does not intend to limit the present invention to a specific disclosure form, and it will be appreciated that the present invention includes all of the modifications, equivalent matters, and substitutes included in the spirit and the technical scope of the present invention. Terms "first", "second" and the like may be used for describing various constituent elements, but the constituent elements should not be limited to the terms.

The terms are used only to discriminate one constituent element from another constituent element. For example, without departing from the scope of the invention, a first constituent element may be named as a second constituent element, and similarly a second constituent element may also be named as a first constituent element. It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Other expressions, that is, "between ~" and "directly between ~" or "adjacent to ~" and "directly adjacent to ~" explaining a relationship between the constituent elements should be interpreted in the same way. Terms used in the present application are used only to describe specific exemplary embodiments, and are not intended to limit the present invention. Singular expressions used herein include plural expressions unless they have definitely opposite meanings in the context.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. All terms used herein including technical or scientific terms have the same meanings as meanings which are generally understood by those skilled in the art unless they are differently defined. Terms defined in a generally used dictionary shall be construed that they have meanings matching those in the context of a related art, and shall not be construed in ideal or excessively formal meanings unless they are clearly defined in the present application.

FIG. 1 is a diagram illustrating an example of an Around View Monitoring (AVM) system 10 according to an exemplary embodiment of the present invention. Referring to FIG. 1, the AVM system 10 may include a plurality of cameras 110, 120, 130, and 140, an image signal processing device 200, and a display device 300.

Each of the plurality of cameras 110, 120, 130, and 140 may be disposed at a predetermined location of a vehicle and acquire image data of the surrounding of the vehicle. In FIG. 1, the cameras 110, 120, 130, and 140 may be disposed in a front side, a rear side, a left side, and a right side of the vehicle, respectively. However, it shall be understood that the number and the disposition of the cameras of the present invention are not limited thereto.

In the exemplary embodiment, each of the cameras 110, 120, 130, and 140 may be implemented with a wide angle camera having a viewing angle of 180° or more so as to photograph an environment of the surrounding of the vehicle.

The image signal processing device 200 may be implemented so as to receive image data from the plurality of cameras 110, 120, 130, and 140 wirely or wirelessly and process the received image data to image data for assisting driving of a driver (user).

In the exemplary embodiment, the image signal processing device 200 may perform various processing operations for improving an image. For example, the image signal processing device 200 may process Bayer regions of raw images output from image sensors of the cameras 110, 120, 130, and 140.

Color information correction and adjustment control may be performed on an RGB region. Image improvement and optimization may be performed on a YUV region. Further, the image signal processing device 200 may perform noise reduction, rectification, calibration, color enhancement, Color Space Conversion (CSC), interpolation, camera gain control, and the like on image data.

In the exemplary embodiment, the image signal processing device 200 may apply a technology specialized to the rear camera (for example, the camera 120) and process image data. Herein, the technology specialized to the rear camera may include Lens Distortion Correction (LDC), image stitching, and the like.

In the exemplary embodiment, the image signal processing device 200 may be implemented so as to avoid a connection region blind spot generated due to a difference in a viewing angle at the time of an image synthesis. For example, the image signal processing device 200 may synthesize images based on a single viewing angle without overlapping a viewing angle of a specific region and decrease the degree of distortion correction for a connection region.

The display device 300 may be implemented so as to display or control the image data processed by the image signal processing device 200. In the exemplary embodiment, the display device 300 may include a navigation device.

A general AVM system may cause a phenomenon in which an object in a blind spot disappears due to a viewing angle when an image received from the plurality of cameras is synthesized. In the meantime, the AVM system 10 according to the exemplary embodiment of the present invention may synthesize an image based on a single viewing angle, thereby fundamentally preventing the phenomenon in which an object in a blind spot disappears.

Figure 2A:
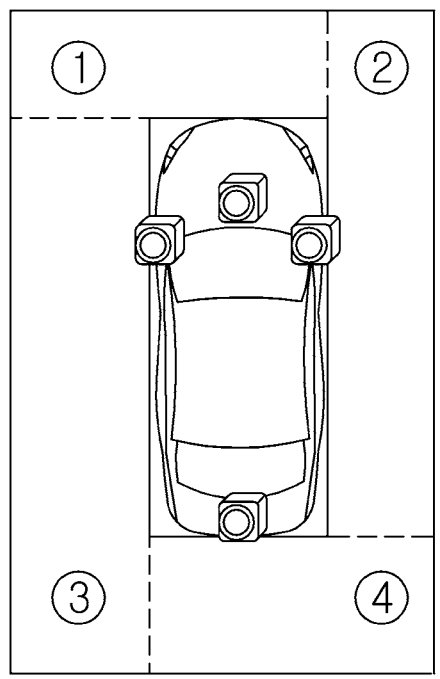
FIG. 2A and FIG. 2B are diagrams conceptually illustrating a method of displaying an AVM image based on a single viewing angle by the AVM system 10 according to the exemplary embodiment of the present invention.
Figure 2B:
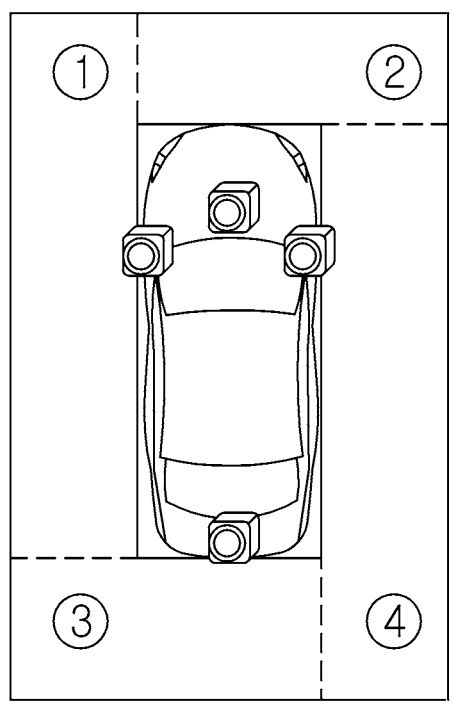

FIGS. 2A and 2B are diagrams conceptually illustrating a method of displaying an AVM image based on a single viewing angle by the AVM system 10 according to the exemplary embodiment of the present invention.

First, the image signal processing device 200 may receive image data from the four cameras 110, 120, 130, and 140. The image signal processing device 200 may perform Lens Distortion Correction (LDC) on the received four images.

In FIGS. 2A and 2B, photographed zones (zones divided by quadrangles) of the cameras are set in the surroundings of the vehicle, and areas ①, ②, ③, and ④ indicate positions overlappable in the case where the images are synthesized according to the related art.

The areas ①, ②, ③, and ④ may overlap to form blind spots in the case where the images are synthesized according to the related art, but when the photographed zones of the cameras are set as illustrated in FIGS. 2A and 2B, each of the areas ①, ②, ③, and ④ is photographed only by any one camera, so that a blind spot is not formed.

Like the case of FIG. 2A, a viewing angle of a left region may be set to be larger than that of a right region based on a single camera. Like the case of FIG. 2B, a viewing angle of a right region may be set to be larger than that of a left region based on a single camera. In the meantime, it shall be understood that the single visual field image display method for removing an overlapping region is not limited thereto, and a viewing angle of a left region may also be set to be the same as that of a right region based on a single camera.

That is, according to an image display method, a viewing angle of the single camera of the left region may be larger than that of the right region, a viewing angle of the single camera of the right region may be larger than that of the left region, or a viewing angle of the single camera of the right region may be the same as that of the left region.

In the exemplary embodiment, in the case of FIG. 2A, the overlapping region ② at the front side, the overlapping regions ① and ④ at the lateral sides, and the overlapping region ③ at the rear side may be removed. In another exemplary embodiment, in the case of FIG. 2B, the overlapping region ① at the front side, the overlapping regions ② and ③ at the lateral sides, and the overlapping region ④ at the rear side may be removed.

Then, an image of the surroundings of the vehicle may be generated by synthesizing four images. In FIG. 2, the image of the surroundings of the vehicle may be generated based on the display method 1) or the display method 2). In addition, the AVM image display method based on a single viewing angle may be variously changed according to environment information, such as steering angle information or object direction information.

Figure 3A:
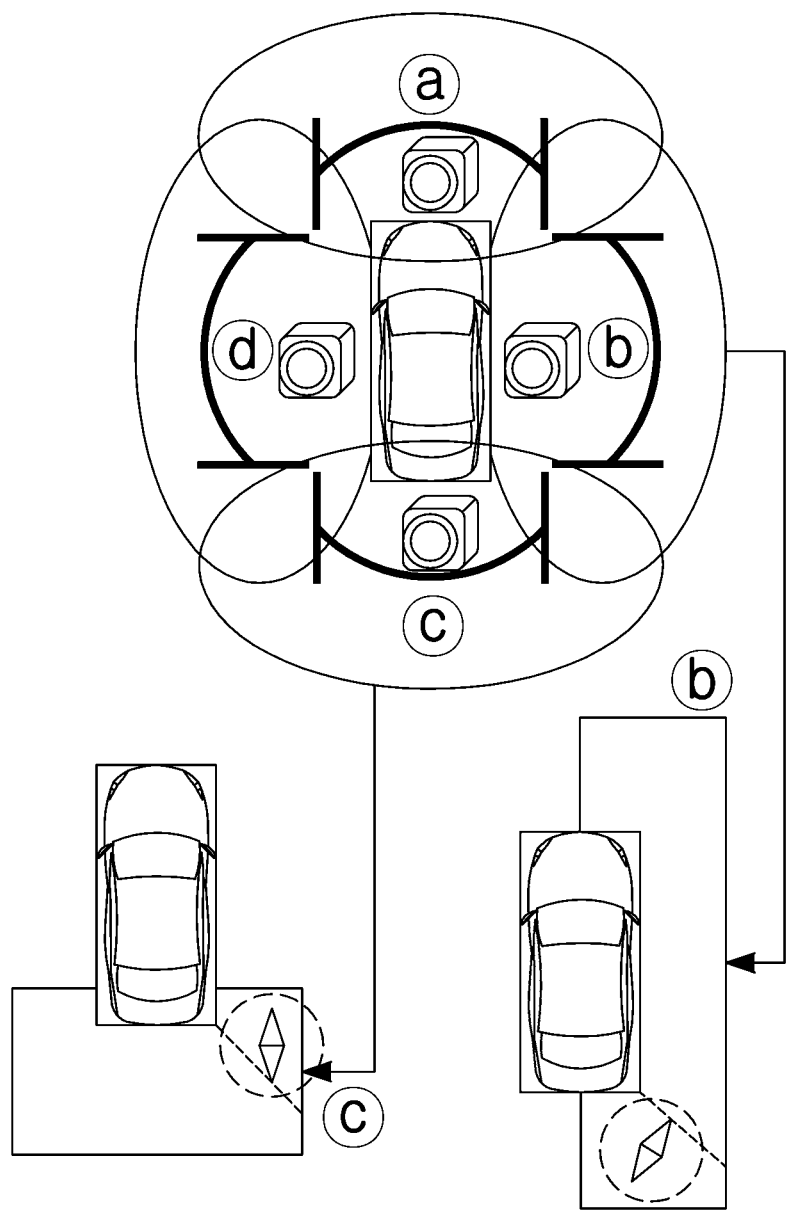
FIG. 3A is a diagram illustrating an example of photographed areas of cameras according to the related art.
Figure 3B:
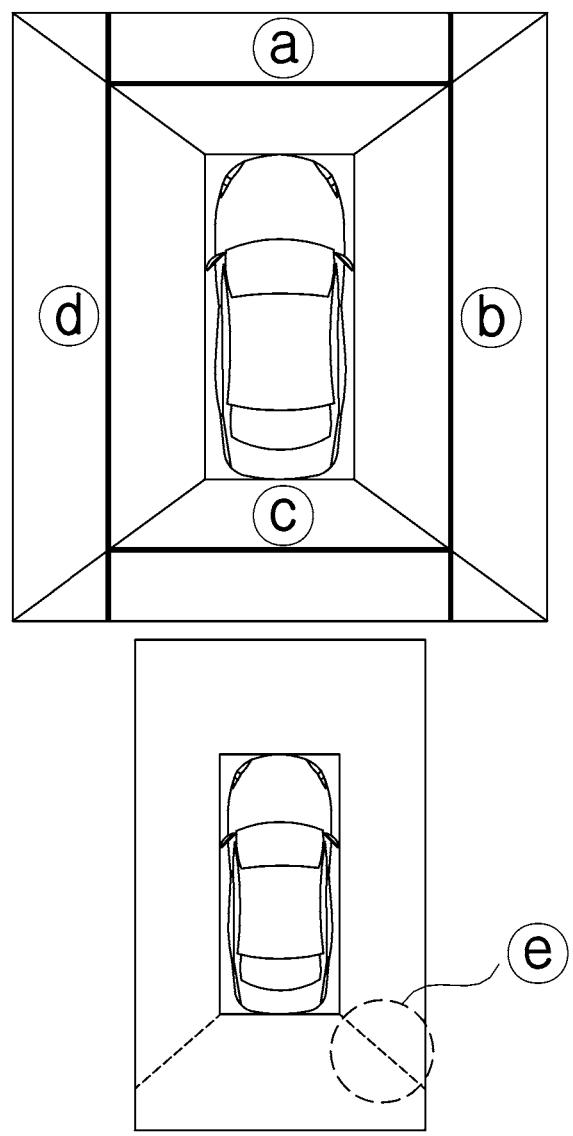
FIG. 3B is a diagram illustrating an overlapping area in a photographed image of a rear camera and a photographed image of a right camera in FIG. 3A.
Figure 3C:
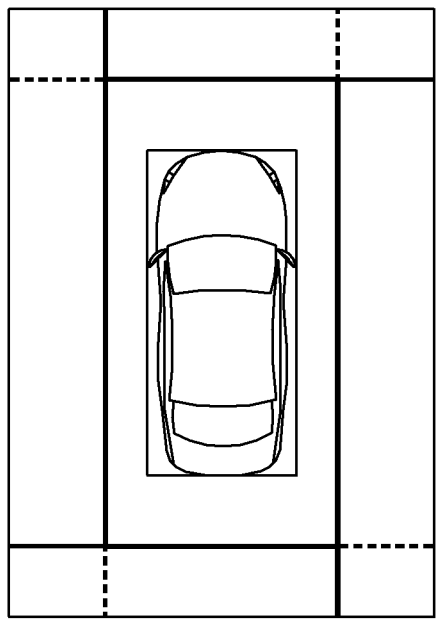
FIG. 3C is a diagram illustrating an example of viewing angles of cameras adjusted so as to avoid a connection region blind spot generated due to a difference in a viewing angle in the AVM system 10 according to the exemplary embodiment of the present invention.
Figure 3C:
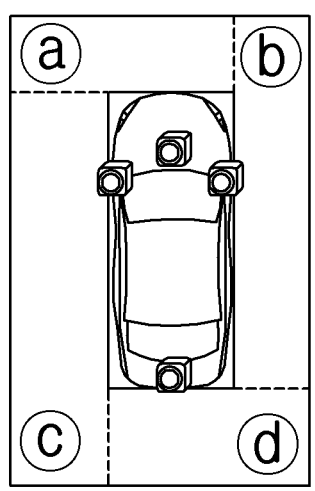
Figure 3C:
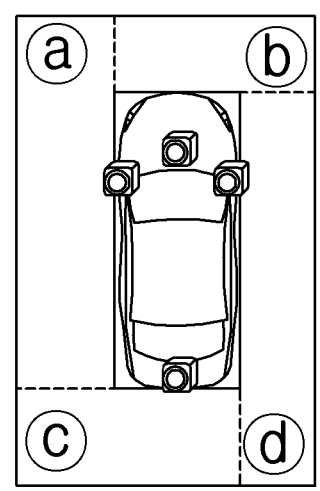

FIG. 3A is a diagram illustrating an example of photographed areas of cameras according to the related art, FIG. 3B is a diagram illustrating an overlapping area in a photographed image of a rear camera and a photographed image of a right camera in FIG. 3A, and FIG. 3C is a diagram illustrating an example of viewing angles of cameras adjusted so as to avoid a connection region blind spot generated due to a difference in a viewing angle in the AVM system 10 according to the exemplary embodiment of the present invention.

When photographed areas ⓐ, ⓑ, ⓒ, and ⓓ of the camera are set as illustrated in FIG. 3A, there may exist a connection region blind spot (for example, ⓔ of FIG. 3B) generated due to a difference in a viewing angle when the images of the four cameras are synthesized. In the case where a driver parks a car while watching the image synthesized display, when there is an object (a person) in a blind spot, a dangerous situation may be generated.

In the meantime, as illustrated in FIG. 3C, the AVM system 10 according to the exemplary embodiment of the present invention sets the viewing angles of the cameras so as to avoid the connection region blind spot like the cases of Examples 1 and 2, so that it is possible to synthesize the images with one viewing angle without overlapping a viewing angle of a specific region. Herein, in the connection portion (the boundary portion), the degree of distortion correction may be adjusted. When the images are synthesized in the AVM system 10 of the present invention, single viewing angle image data is used, so that a blind spot is not fundamentally generated.

Figure 4A:
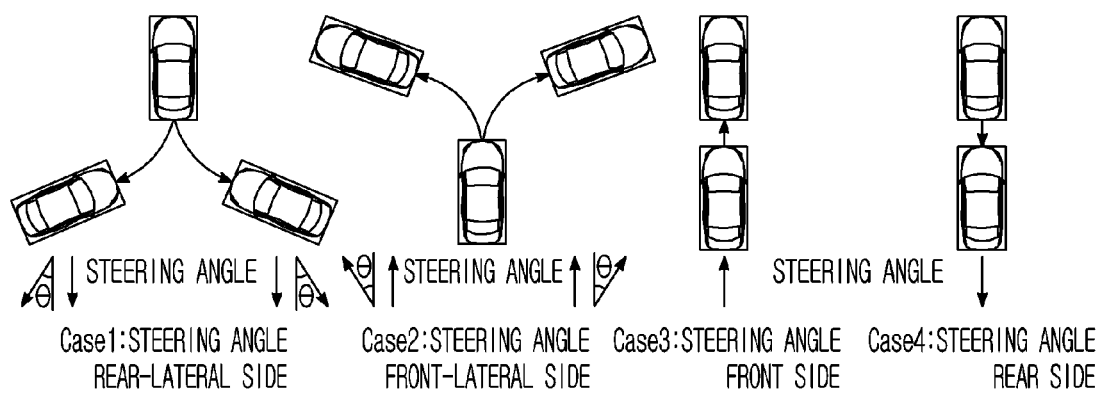
FIG. 4A is a diagram illustrating various examples of a synthesized image display method of the AVM system according to the exemplary embodiment of the present invention.
Figure 4B:
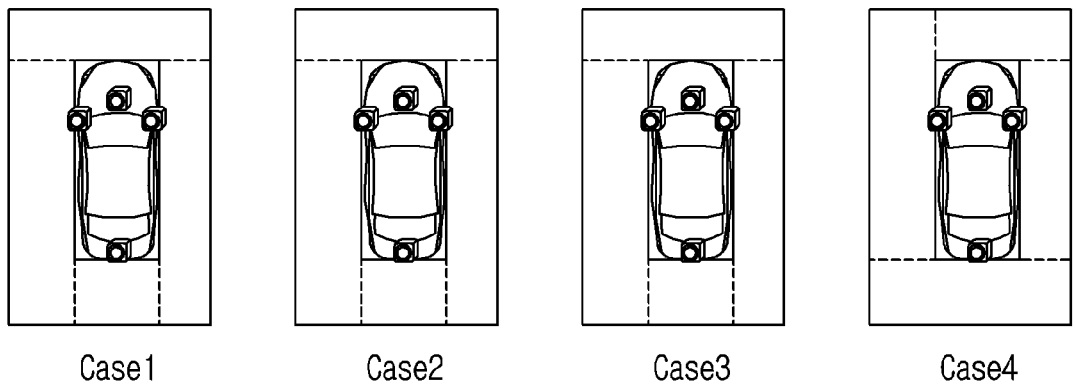
FIG. 4B is a diagram for describing a synthesized image display method according to a change in a steering angle.

FIG. 4A is a diagram illustrating various examples of a synthesized image display method of the AVM system according to the exemplary embodiment of the present invention, FIG. 4B is a diagram for describing a synthesized image display method according to a change in a steering angle, and FIG. 4C is a diagram for describing a synthesized image display method according to information about a nearest object direction.

The synthesized image display method of the AVM system 10 according to the exemplary embodiment of the present invention is not limited to the examples illustrated in FIG. 4A and may be variously set, and an appropriate display method may be selected according to steering information (reference 1).

Case1 of FIG. 4B is the case where the vehicle moves to the rear-lateral side according to a steering angle, and the AVM system 10 may display a synthesized image according to the display method of Case1 of FIG. 4A.

Case2 of FIG. 4B is the case where the vehicle moves to the front-lateral side according to a steering angle, and the AVM system 10 may display a synthesized image according to the display method of Case2 of FIG. 4A.

Case3 of FIG. 4B is the case where the vehicle moves to the front side according to a steering angle, and the AVM system 10 may display a synthesized image according to the display method of Case3 of FIG. 4A.

Case4 of FIG. 4B is the case where the vehicle moves to the rear side according to a steering angle, and the AVM system 10 may display a synthesized image according to the display method of Case4 of FIG. 4A.

As described above, the AVM system 10 may display a synthesized image according to an appropriate synthesized image display method among various synthetized image display methods based on steering information.

In this case, the AVM system 10 may be set to select a method of enlarging a lateral-directional external side display region when a current input steering angle is equal to or larger than a predetermined steering angle (set steering angle).

In the meantime, the synthesized image display method may also be determined based on information (reference 2) about a nearest object direction, and the information about a nearest object direction is the information related to a direction in which a nearest object is located, and may be obtained based on transception of an ultrasonic signal.

Referring to Case1 of FIG. 4C, when it is detected that a nearest object at the rear side exists in a center direction within a detection region while the AVM system 10 displays a synthesized image based on the display method of Case1 of FIG. 4A according to the movement of the vehicle like Case1 (the movement of the vehicle to the rear side at a steering angle of the set steering angle or more) of FIG. 4B, the AVM system 10 displays a synthesized image based on the display method of Case4 of FIG. 4A in order to display a center region-centered image.

Referring to Case2 of FIG. 4C, when it is detected that a nearest object at the rear side exists in an outer peripheral direction within a detection region while the AVM system 10 displays a synthesized image based on the display method of Case4 of FIG. 4A according to the movement of the vehicle like Case4 (the straight movement of the vehicle to the rear side) of FIG. 4B, the AVM system 10 displays a synthesized image based on the display method of Case1 of FIG. 4A in order to display an outer peripheral region-centered image.

Referring to Case3 of FIG. 4C, when it is detected that a nearest object at the front side exists in a center direction within a detection region while the AVM system 10 displays a synthesized image based on the display method of Case2 of FIG. 4A according to the movement of the vehicle like Case2 (the forward movement of the vehicle at a steering angle of the set steering angle or more) of FIG. 4B, the AVM system 10 displays a synthesized image based on the display method of Case3 of FIG. 4A in order to display a center region-centered image.

Referring to Case4 of FIG. 4C, when it is detected that a nearest object at the front side exists in an outer peripheral direction within a detection region while the AVM system 10 displays a synthesized image based on the display method of Case3 of FIG. 4A according to the movement of the vehicle like Case3 (the straight movement of the vehicle to the front side) of FIG. 4B, the AVM system 10 displays a synthesized image based on the display method of Case2 of FIG. 4A in order to display an outer peripheral region-centered image.

Figure 5A:
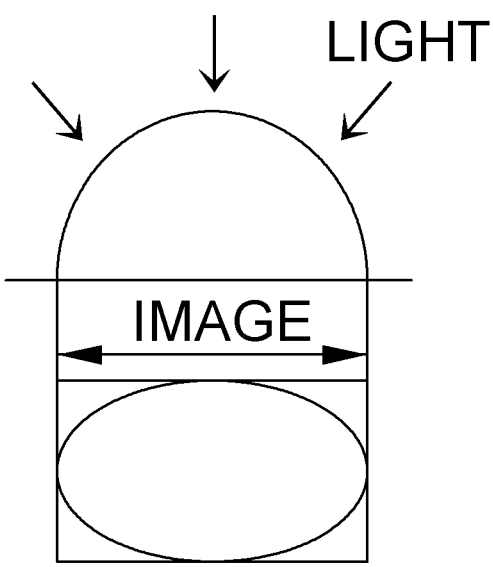
Figure 5B:
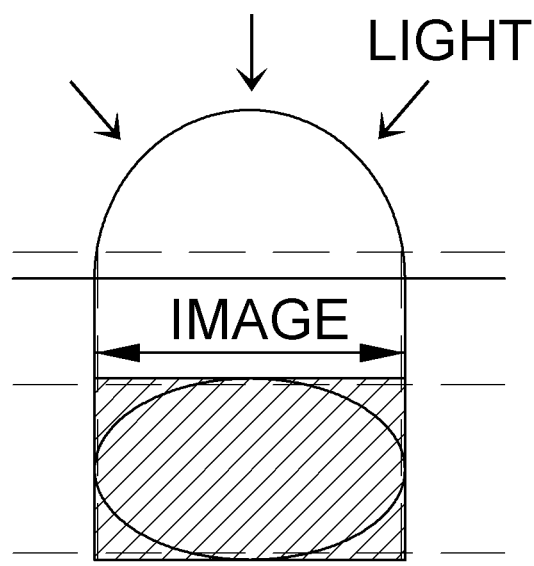

FIGS. 5A to 5C are diagrams illustrating an example of a method of adjusting the degree of distortion correction of an overlapping connection portion in the AVM system 10 according to the exemplary embodiment of the present invention, and FIG. 5A illustrates an image before the correction, FIG. 5B illustrates an image after the correction, and FIG. 5C illustrates an image obtained by applying a distortion correction rate to the image before the correction.

Referring to FIG. 5C, it can be seen that enlargement and reduction are repeated from a center image division unit to an outer peripheral side. Accordingly, it can be seen that in the image (FIG. 5B) after the correction, an image of an outer peripheral portion of the image (FIG. 5A) before the correction is left.

As described above, the distortion correction of the overlapping connection portion may be performed by a variable distortion correction rate.

Figure 6A:
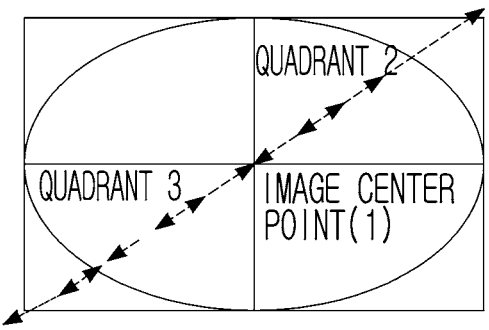
FIG. 6A, FIG. 6B, FIG. 6C, and FIG. 6D are diagrams illustrating an example of a variable rate distortion correcting method according to an exemplary embodiment of the present invention.
Figure 6B:
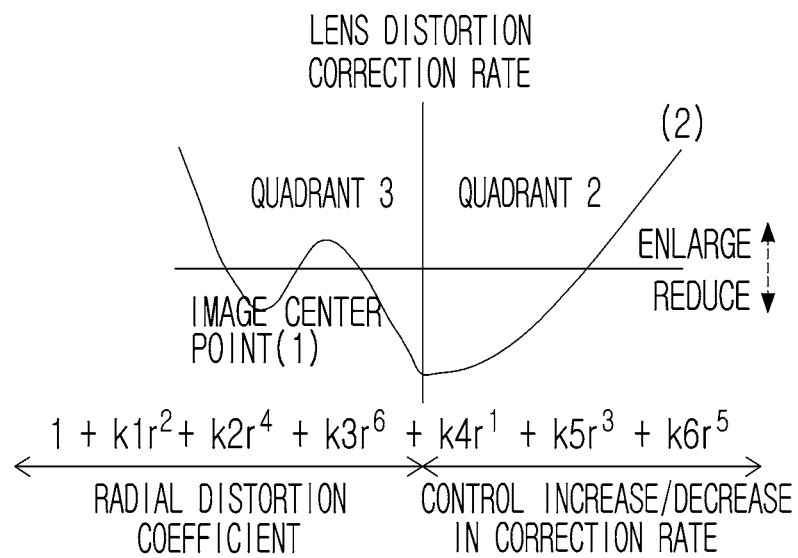
Figure 6C:
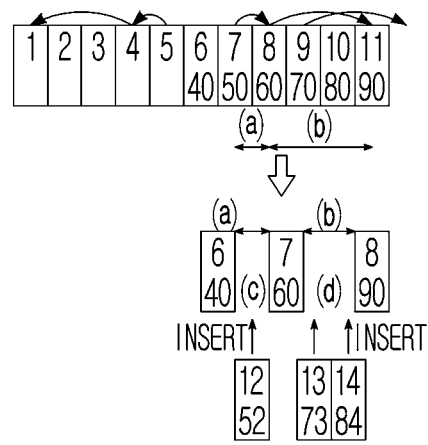
Figure 6D:
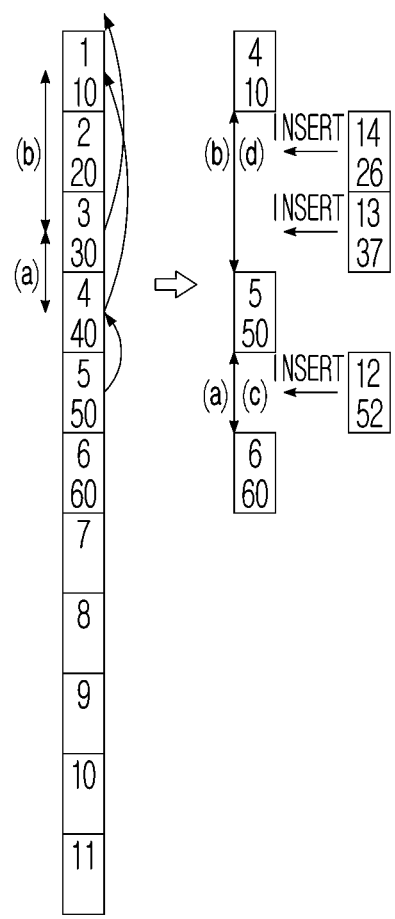

FIGS. 6A to 6C are diagrams illustrating an example of a variable rate distortion correcting method according to an exemplary embodiment of the present invention, and FIG. 6A illustrates first operation of a variable rate distortion correction method, FIG. 6B illustrates second operation of a variable rate distortion correction method, FIG. 6C illustrates third operation of a variable rate distortion correction method, and FIG. 6D illustrates fourth operation of a variable rate distortion correction method.

Referring to FIGS. 6A to 6D, the variable rate distortion correcting method for an overlapping connection portion may be performed as described below. First, an image center may be set for image data (FIG. 6A). The image center may be set in the case, for example, where a camera is installed in a vehicle, and the image center may be newly set (reset) by a user.

Then, radial distortion coefficients k1, k2, k3, k4, k5, and k6 in a lens distortion correction rate function may be set (FIG. 6B). The radial distortion coefficient may be set during a process of setting the AVM system 10, and may be appropriately determined through the large amount of experimental data.

In the Equation of FIG. 6B, r is a distance from a predetermined pixel to a center when there is no distortion, x is a value of an x-coordinate of the predetermined pixel in an image, and y is a value of a y-coordinate of the predetermined pixel in the image.

The Equation of FIG. 6B is defined as a lens distortion correction rate function, and a result value of the Equation is a lens distortion correction rate. Accordingly, a lens distortion correction rate in a predetermined pixel within an image is determined according to a radial distortion coefficient, which means that it is possible to control an increase/decrease in a lens distortion correction rate for each pixel through a radial distortion coefficient.

Next, horizontal image interpolation may be performed on the image data (FIG. 6C). Next, vertical image interpolation may be performed on the image data (FIG. 6D). In FIGS. 6C and 6D, numbers at upper ends represent locations of the pixels, and numbers at lower ends represent pixel values, and in the cases of (a) and (b), a pixel is shifted and converted by a variable ratio, and the cases of (c) and (d) mean interpolation spaces by a variable ratio conversion.

Figure 7:
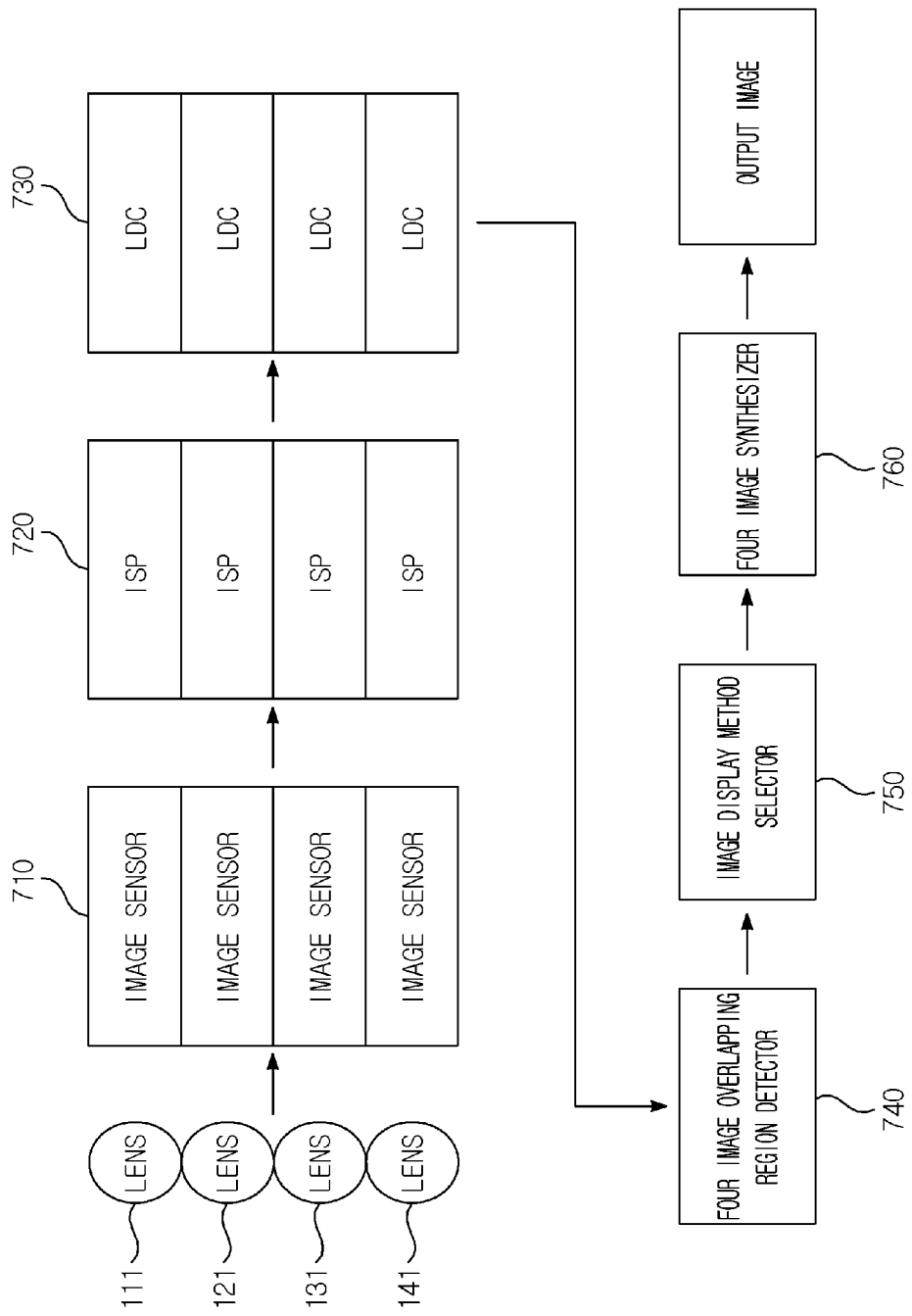
FIG. 7 is a flowchart illustrating an example of an operating method of the AVM system 10 according to an exemplary embodiment of the present invention.

FIG. 7 is a flowchart illustrating an example of an operating method of the AVM system 10 according to an exemplary embodiment of the present invention. Referring to FIGS. 1 to 7, the AVM system 10 may be operated as described below.

An image sensor 710 may obtain image data through lens 111, 121, 131, and 141 of the cameras 110, 120, 130, and 140. The obtained image data may be processed by a corresponding Image Signal Processor (ISP) 720. The processed image data may be distortion-corrected by a corresponding Lens Distortion Corrector (LDC) 730. Then, corresponding overlapping regions may be detected by four image overlapping region detectors 740.

Then, the overlapping region may be removed by an image display method selector 750, and an image display method according to a single viewing angle may be selected. A desired image display method for the detected overlapping region may be selected.

Then, the four elements of selected image data may be synthesized by an image synthesizer 760 according to the selected image display method. In the exemplary embodiment, when the images are synthesized, boundary portions between different images may be synthesized by adjusting a lens distortion correction rate for the image displayed according to the selected image display method.

In the meantime, the image data processor 720, the lens distortion corrector 730, the image overlapping region detector 740, the image display method selector 750, and the image synthesizer 760 may be included in the image signal processing device 200 illustrated in FIG. 2 in the form of software, hardware, or firmware. Then, the synthesized data may be finally output to the display device 300. That is, final synthesized image data corresponding to the four elements of image data may be output.

The steps and/or the operations according to the present invention may be simultaneously incurred in other exemplary embodiments in a different order, in parallel, or for another epoch, which will be understood by those skilled in the art.

Depending on an exemplary embodiment, a part or all of the steps and/or the operations may be implemented or performed by using one or more processors driving a command stored in one or more non-temporary computer-readable media, a program, an interactive data structure, a client, and/or a server. An example of the one or more non-temporary computer-readable media may be software, firmware, hardware, and/or any combination thereof. Further, a function of a "module" discussed in the present specification may be implemented by software, firmware, hardware, and/or any combination thereof.

One or more non-temporary computer-readable media and/or means for implementing/performing one or more operations/steps/modules of the exemplary embodiments of the present invention may include Application-Specific Integrated Circuits (ASICs), standard integrated circuits, a microcontroller, a controller performing appropriate commands, an embedded controller, Field-Programmable gate Arrays (FPGAs), Complex Programmable Logic Devices (CPLDs), and the equivalent matters thereof, but are not limited thereto.

In the meantime, the contents of the present invention are simply the particular exemplary embodiments for carrying out the present invention. The present invention may include a technical spirit that is abstract and conceptual idea utilizable as a technology in the future, as well as a particular and actually usable means itself As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of operating an Around View Monitoring (AVM) system, the method comprising:
    obtaining image data from a plurality of image sensors disposed at different locations of a vehicle;
    performing image processing on the image data for improving an image;
    performing lens distortion correction on the processed image data;
    detecting an overlapping region from the corrected image data;
    selecting an image display method so as to prevent the detected overlapping region from overlapping when the image is synthesized, and synthesizing the image data according to the selected image display method; and
    outputting the synthesized image data,
    wherein the synthesizing of the image data includes synthesizing the image data by adjusting a lens distortion correction rate for a boundary portion between the image data of the plurality of image sensors, and
    wherein the lens distortion correction rate is determined by a radial distortion coefficient in a predetermined lens distortion correction rate function.

2. The method of claim 1, wherein the different locations of the vehicle include a front side, a rear side, a left side, and a right side.

3. The method of claim 1, wherein the performing of the lens distortion correction includes:
    setting an image center for the image data;

setting the radial distortion coefficient as an input value of the predetermined lens distortion correction rate function;

performing horizontal image interpolation on the image data according to a variable ratio determined by the lens distortion correction rate, wherein the lens distortion correction rate is determined by the set radial distortion coefficient in the predetermined lens distortion correction rate function; and performing vertical image interpolation on the image data according to the variable ratio.

4. The method of claim 1, wherein according to the selection of the image display method, at a viewing angle of a single camera, a left region is larger than a right region, a right region is larger than a left region, or a right region is the same as a left region.

5. The method of claim 1, wherein the image display method is selected based on steering information or object direction information.

6. The method of claim 5, wherein when the steering information indicates that a steering angle is a predetermined steering angle or more, the image display method is selected so as to enlarge a lateral outer peripheral display region.

7. The method of claim 5, wherein when the object direction information indicates that a nearest object location is in a center direction within a detected region, the image display method is selected for displaying a center region-centered image.

8. The method of claim 5, wherein when the object direction information indicates that a nearest object location is in an outer peripheral direction within a detected region, the image display method is selected for displaying an outer peripheral-centered image.

9. An Around View Monitoring (AVM) system, comprising:

a plurality of cameras disposed in a vehicle and obtaining image data from a surrounding environment of the vehicle;

an image signal processing device, which receives image data from the plurality of cameras, performs image processing on the received image data for improving an image; performs lens distortion correction on the processed image data, detects an overlapping region from the corrected image data, selects an image display method which does not overlap the overlapping region when the image is synthesized, and synthesizes the image data according to the selected image display method; and a display device, which displays the image data synthesized from the image signal processing device, wherein the synthesizing of the image data includes synthesizing the image data by adjusting a lens distortion correction rate for a boundary portion between the image data of the plurality of cameras, and wherein the image signal processing device is configured to determine the lens distortion correction rate by a radial distortion coefficient according to a predetermined lens distortion correction rate function.

10. The AVM system of claim 9, wherein the image signal processing device adjusts the lens distortion correction rate of a synthesized boundary surface when the image data is synthesized.

11. The AVM system of claim 9, wherein the image signal processing device selects the image display method based on steering information or object direction information.

12. The AVM system of claim 9, wherein according to the selection of the image display method by the image signal processing device, at a viewing angle of a single camera, a left region is larger than a right region, a right region is larger than a left region, or a right region is the same as a left region.

13. The AVM system of claim 11, wherein when the steering information indicates that a steering angle is a predetermined steering angle or more, the image signal processing device selects the image display method so as to enlarge a lateral outer peripheral display region.

14. The AVM system of claim 11, wherein when the object direction information indicates that a nearest object location is in a center direction within a detected region, the image signal processing device selects the image display method for displaying a center region-centered image.

15. The AVM system of claim 11, wherein when the object direction information indicates that a nearest object location is in an outer peripheral direction within a detected region, the image signal processing device selects the image display method for displaying an outer peripheral-centered image.

16. The AVM system of claim 9, wherein the image signal processing device is configured to perform the lens distortion correction by:

setting an image center for the image data;

setting the radial distortion coefficient as an input value of the predetermined lens distortion correction rate function;

performing horizontal image interpolation on the image data according to a variable ratio determined by the lens distortion correction rate, wherein the lens distortion correction rate is determined by the set radial distortion coefficient in the predetermined lens distortion correction rate function; and performing vertical image interpolation on the image data according to the variable ratio.

* * * * *